United States Patent
Zhang et al.

(10) Patent No.: US 12,440,277 B1
(45) Date of Patent: Oct. 14, 2025

(54) METHODS AND SYSTEMS FOR GUIDING INTERVENTIONAL SURGERY

(71) Applicant: Shanghai Bingzuo Jingyi Technology Co., Ltd., Shanghai (CN)

(72) Inventors: Jihong Zhang, Shanghai (CN); Ligang He, Shanghai (CN); Simeng Liu, Beijing (CN)

(73) Assignee: Shanghai Bingzuo Jingyi Technology Co., Ltd., Shanghai (CN)

( * ) Notice: Subject to any disclaimer, the term of this patent is extended or adjusted under 35 U.S.C. 154(b) by 0 days.

(21) Appl. No.: 18/755,656

(22) Filed: Jun. 26, 2024

(51) Int. Cl.
| | |
|---|---|
| *A61B 34/10* | (2016.01) |
| *A61B 8/12* | (2006.01) |
| *A61B 34/20* | (2016.01) |
| *G06T 7/00* | (2017.01) |
| *G06T 19/00* | (2011.01) |

(52) U.S. Cl.
CPC .......... *A61B 34/10* (2016.02); *A61B 8/12* (2013.01); *A61B 34/20* (2016.02); *G06T 7/0012* (2013.01); *A61B 2034/104* (2016.02); *A61B 2034/2055* (2016.02); *G06T 19/003* (2013.01); *G06T 2207/30048* (2013.01)

(58) Field of Classification Search
CPC ......... G06T 7/0012; G06T 2207/30048; G06T 19/003; A61B 2034/104; A61B 2034/2055; A61B 34/10; A61B 2034/107; A61B 34/20; A61B 8/12
See application file for complete search history.

(56) References Cited

U.S. PATENT DOCUMENTS

| | | | | |
|---|---|---|---|---|
| 11,950,851 | B1 * | 4/2024 | Roh | A61B 34/20 |
| 2010/0130858 | A1 * | 5/2010 | Arai | A61B 90/11 |
| | | | | 600/443 |
| 2019/0183577 | A1 * | 6/2019 | Fahim | G02B 27/01 |
| 2020/0170617 | A1 * | 6/2020 | de Vaan | A61B 34/20 |
| 2021/0369394 | A1 * | 12/2021 | Braido | A61B 34/76 |
| 2022/0409293 | A1 * | 12/2022 | Ben-Haim | A61B 5/367 |

(Continued)

OTHER PUBLICATIONS

First Office Action issued in corresponding Chinese Application No. 202410726474.8, dated Feb. 14, 2025, 7 pages.

*Primary Examiner* — Jack Yip
(74) *Attorney, Agent, or Firm* — IPX PLLC

(57) ABSTRACT

Methods and systems for guiding interventional surgery are provided. The method includes receiving a plurality of intracardiac echocardiography (ICE) images of a target object acquired during a preset period, analyzing of the plurality of ICE images to obtain image analysis results, and generating an interventional surgical plan based on the image analysis results to guide the interventional surgery. This method conducts image analysis on ICE image before puncture to plan the interventional surgery, thus identifying the optimal puncture angle, depth, and timing for the interventional surgery. The method can help conduct real-time detection and tracking of the puncture process, identifying and mitigating potential risks during the surgical process to improve the success rate of the surgery. Furthermore, continuous assessment and management of possible complications can be carried out through postoperative evaluation to comprehensively reduce the risk of the interventional surgery and enhance its effectiveness and safety.

20 Claims, 5 Drawing Sheets

(56) References Cited

U.S. PATENT DOCUMENTS

| | | | |
|---|---|---|---|
| 2023/0098497 A1* | 3/2023 | Laby | A61B 90/361 |
| | | | 606/130 |
| 2023/0119535 A1 | 4/2023 | Michiels et al. | |
| 2023/0259820 A1* | 8/2023 | El-Zehiry | G16H 50/20 |
| | | | 706/12 |
| 2023/0363821 A1* | 11/2023 | Levin | G09B 23/28 |

\* cited by examiner

METHODS AND SYSTEMS FOR GUIDING INTERVENTIONAL SURGERY

CROSS-REFERENCE TO RELATED APPLICATION

This application claims priority to Chinese Patent Application No. 202410726474.8, filed Jun. 6, 2024, which is expressly incorporated herein by reference.

TECHNICAL FIELD

This application relates to the field of image processing technology, particularly involving image processing for guiding interventional surgery.

BACKGROUND

In recent years, percutaneous interventions have been widely utilized in the treatment of cardiovascular diseases. These interventions include procedures such as left atrial catheter ablation, left atrial appendage (LAA) occlusion, and percutaneous mitral valve interventions, typically requiring access to the left atrium via the veins for treatment. To minimize risks, intervention devices are usually inserted through the veins, passing through the right atrium before penetrating the interatrial septum to access the left side of the heart and other anatomical structures.

Accurate puncture site localization is crucial in reducing surgical complications during percutaneous interventions. The optimal puncture site may vary based on subsequent treatments and procedure types. For instance, a posterior puncture location may be ideal for LAA occlusion, allowing more space in the left atrium by puncturing through the central part of the interatrial septum to facilitate the placement of left ventricular assist devices. X-ray guidance is commonly used for septal punctures, while emerging imaging modalities like transesophageal echocardiography (TEE) and intracardiac echocardiography (ICE) provide real-time monitoring and visualization without exposure to X-rays, making them good options in medical imaging diagnostics.

However, current TEE or ICE images are often two-dimensional and lack spatial information, posing challenges in accurately locating target puncture points and tracking catheter tips.

SUMMARY

The technical problem addressed by the present disclosure is to overcome the shortcomings in existing technologies that fail to accurately locate the target puncture point and track the tip of a catheter based on TEE or ICE images. The disclosure provides a method, system, device, medium, and program product for guiding interventional surgery.

The present disclosure addresses the above technical problem through the following technical solutions:

According to the first aspect of the present disclosure, a method for guiding interventional surgery is provided, mentioned method comprising:
  Collecting a plurality of imaging images of a target object within a predetermined time period, wherein the imaging images include intracardiac echocardiography (ICE);
  Performing image analysis on the plurality of imaging images to obtain image analysis results, and generating an interventional surgery planning scheme based on the image analysis results to guide the execution of the interventional surgery.

In some embodiments, the steps of performing image analysis on the plurality of imaging images to obtain image analysis results and generating an interventional surgery planning scheme based on the image analysis results comprise:
  Using a predetermined object detection algorithm to perform object detection on the plurality of imaging images to obtain target puncture areas on the target object;
  Generating the interventional surgery planning scheme based on the target puncture area.

In some embodiments, the target object includes the heart, and the target puncture areas include the fossa ovalis on the heart;
  The steps of generating the interventional surgery planning scheme based on the target puncture area include:
    Simulating geometric changes of the fossa ovalis caused by different puncture positions;
    When the predetermined puncture indicators appear in the geometric changes of the fossa ovalis, the puncture position is determined as the target puncture location;
    Generating the interventional surgery planning scheme based on the target puncture position.

In some embodiments, the steps of determining the puncture position as the target puncture location when the predetermined puncture indicators appear in the geometric changes of the fossa ovalis include:
  Determining whether tenting sign appears in the geometric changes of the fossa ovalis, where the tenting sign indicates a tent-like dome formation directed towards the left atrium at the interatrial septum before actual puncture behavior occurs;
  If the tenting sign appears, determining whether the tenting sign is coaxial with the puncture needle;
  If yes, the position where the tenting sign appears is determined as the target puncture location.

In some embodiments, the interventional surgery planning scheme includes at least one of target puncture angle, target puncture timing, and target puncture depth.

In some embodiments, the method further includes:
  Constructing a three-dimensional anatomical model or a stereoscopic anatomical model of the target object based on several imaging images.

In some embodiments, the method further includes:
  identifying the target puncture locations on the three-dimensional anatomical model or the stereoscopic anatomical model corresponding to the target object.

In some embodiments, before the step of performing image analysis on the plurality of imaging images, the method further includes:
  Performing merging processing on several imaging images to obtain a first image, where the field of view of the first image is greater than that of the imaging images;
  The steps of performing image analysis on the plurality of imaging images to obtain image analysis results and generating an interventional surgery planning scheme based on the image analysis results include:
  Performing image analysis on the first image to obtain first image analysis results, and generating the interventional surgery planning scheme based on the first image analysis results.

In some embodiments, before the step of using a predetermined object detection algorithm to perform object detection on several imaging images, the method further includes:

Utilizing a predetermined image segmentation algorithm to segment several imaging images to obtain several second images;

The step of using a predetermined object detection algorithm to perform object detection on several imaging images includes:

Performing object detection on the second images and/or several images based on the predetermined object detection algorithm.

In some embodiments, the predetermined object detection algorithm includes a large-scale object detection model.

Moreover, the method further includes:

Collecting surgical-related data during the interventional surgery process, where the interventional surgery is performed based on the interventional surgery planning scheme;

Obtaining postoperative evaluation results of the interventional surgery based on several imaging images and the surgical-related data.

In some embodiments, after the step of collecting surgical-related data during the interventional surgery process, the method further includes:

Identifying surgical risks based on the surgical-related data;

Issuing warnings when the surgical risks meet warning conditions.

In some embodiments, before the step of guiding the interventional surgery based on the interventional surgery planning scheme, the method further includes:

Receiving modification parameters for the interventional surgery planning scheme;

Updating the interventional surgery planning scheme to obtain a new one based on the modification parameters.

In some embodiments, the step of receiving the modification parameters for the interventional surgery planning scheme includes:

Receiving modification parameters from external interactive inputs.

In some embodiments, the step of receiving the modification parameters for the interventional surgery planning scheme includes:

Receiving modification parameters generated by a predetermined large model.

In some embodiments, the steps of performing image analysis on several imaging images to obtain image analysis results and generating the interventional surgery planning scheme based on the image analysis results to guide the execution of the interventional surgery include:

Utilizing a predetermined image segmentation algorithm to segment several imaging images to obtain several second images;

Analyzing the second image through image analysis, and integrating it with the other image images to obtain corresponding quantitative analysis results and/or display results for the target.

Based on the target quantitative analysis results and/or display results, generating the interventional surgery planning scheme to guide the execution of the interventional surgery.

According to the second aspect of the present disclosure, a system for guiding interventional surgery is provided, including an information collection module and a preoperative planning module;

The information collection module is used to collect several imaging images of a target object within a predetermined time period;

The preoperative planning module is used to perform image analysis on several imaging images, obtain image analysis results, and generate an interventional surgery planning scheme based on the image analysis results to guide the execution of the interventional surgery.

In some embodiments, the preoperative planning module comprises an acquisition unit and a generation unit;

The acquisition unit is used to perform object detection on several imaging images using a predetermined object detection algorithm, and obtain target puncture areas on the target object;

The generation unit is used to generate the surgical planning schemes based on the target puncture area.

In some embodiments, the target object includes the heart, and the target puncture areas include the fossa ovalis on the heart; The preoperative planning module further comprises a detection unit;

The detection unit is used to simulate geometric changes of the fossa ovalis caused by different puncture positions; when the predetermined puncture indicators appear in the geometric changes of the fossa ovalis, the puncture position is determined as the target puncture location;

The generation unit is used to generate the interventional surgery planning scheme based on the target puncture position.

In some embodiments, the detection unit further evaluates whether tenting sign appears in the geometric changes of the fossa ovalis, where the tenting sign signifies a tent-like dome formation directed towards the left atrium at the interatrial septum before actual puncture behavior occurs; if the tenting sign appears, the unit further determines whether the tenting sign is coaxial with the puncture needle; if so, the position where the tenting sign appears is considered as the target puncture location.

In some embodiments, the interventional surgery planning scheme includes at least one of target puncture angle, target puncture timing, and target puncture depth.

In some embodiments, the system further includes a construction module;

The construction module is used to construct a three-dimensional anatomical model or a stereoscopic anatomical model of the target object based on several imaging images.

In some embodiments, the system further includes an identification module; The identification module is used to identify the target puncture locations on the three-dimensional anatomical model or the stereoscopic anatomical model corresponding to the target object.

In some embodiments, the system further includes a merging processing module;

The merging processing module is used to perform merging processing on several imaging images to obtain a first image, where the field of view of the first image is greater than that of the imaging images;

The preoperative planning module further performs image analysis on the first image to obtain first image analysis results, and generates the interventional surgery planning scheme based on the first image analysis results.

In some embodiments, the system further includes an image segmentation module;

The image segmentation module is used to utilize a predetermined image segmentation algorithm to segment several imaging images to obtain several second images;

The acquisition unit further performs object detection on several second images and/or several images based on the predetermined object detection algorithm.

In some embodiments, the predetermined object detection algorithm includes a large-scale object detection model.

In some embodiments, the system further includes a postoperative assessment module;

The information collection module further collects surgical-related data during the interventional surgery process, where the interventional surgery is performed based on the interventional surgery planning scheme;

The postoperative assessment module is used to obtain postoperative evaluation results of the interventional surgery based on several imaging images and the surgical-related data.

In some embodiments, the system further includes an intraoperative navigation module;

The intraoperative navigation module is used to identify surgical risks based on the surgical-related data;

When the surgical risks meet warning conditions, warnings are issued.

In some embodiments, the system further includes a parameter reception module;

The parameter reception module is used to receive modification parameters for the interventional surgery planning scheme;

The preoperative planning module further updates the interventional surgery planning scheme to obtain a new one based on the modification parameters.

In some embodiments, the parameter reception module is also used to receive modification parameters from external interactive inputs.

In some embodiments, the parameter reception module is also used to receive modification parameters generated by a predetermined large model.

In some embodiments, the image segmentation module is also used to utilize a predetermined image segmentation algorithm to segment several imaging images to obtain several second images;

The preoperative planning module is also used to perform image analysis on the second image, and integrate it with other image images to obtain corresponding quantitative analysis results and/or display results for the target; Based on the target quantitative analysis results and/or display results, the module generates the interventional surgery planning scheme to guide the execution of the interventional surgery.

According to the third aspect of the present disclosure, an electronic device is provided, comprising a memory, a processor, and a computer program stored in the memory and configured to run on the processor, wherein the processor, when executing the computer program, implements the method described in the first aspect of the present disclosure.

According to the fourth aspect of the present disclosure, a computer-readable storage medium is provided, storing a computer program, wherein the computer program, when executed by a processor, implements the method described in the first aspect of the present disclosure.

In accordance with common knowledge in the field, the various preferred conditions described above may be combined arbitrarily to obtain various exemplary implementations of the present disclosure.

The positive advancement effect of the present disclosure lies in: through image analysis of intracardiac echocardiography (ICE), interventional surgery planning is conducted before puncture, finding the optimal puncture angle, depth, and timing, guiding the interventional surgery, and conducting real-time detection and tracking of the puncture process, identifying and mitigating potential risks during surgery, improving the success rate of the surgery. Additionally, postoperative assessment is performed, providing continuous assessment and management of any adverse effects or complications that may arise, comprehensively reducing the risk of interventional surgery, and improving the effectiveness and safety of puncture surgery.

DETAILED DESCRIPTION

The following embodiments further illustrate the present disclosure, but do not thereby limit the scope of the present disclosure to the described embodiments.

In the embodiments of the present disclosure, terms such as "first" and "second" are used as prefixes solely to distinguish different described objects, without limiting the position, order, priority, quantity, or content of the objects being described. The use of ordinal numbers and similar prefixes in the embodiments of the present disclosure does not impose limitations on the described objects. References to the described objects should be understood in the context of the claims or the description in the embodiments, and should not be construed as additional restrictions due to the use of such prefixes. Additionally, in the description of this embodiment, unless otherwise indicated, the term "multiple" means two or more.

In the embodiments of the present disclosure, the collection, storage, use, processing, transmission, provision, and disclosure of user personal information comply with relevant laws and regulations and do not violate public order and good morals.

Figure 1:
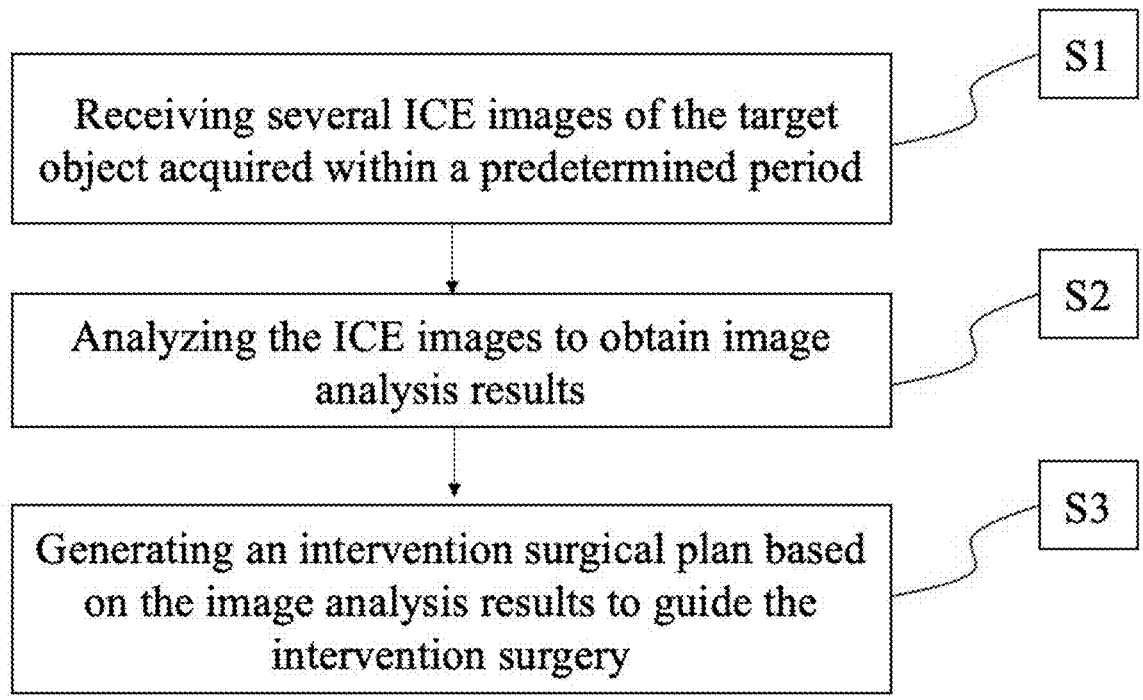
FIG. 1 is a flowchart of an exemplary method for guiding interventional surgery according to embodiments of the present disclosure.

Consistent with some embodiments of the present disclosure, a method for guiding intervention surgery is provided, as shown in FIG. 1. The method includes:

S1: Acquiring several images of the target object within a predetermined period, wherein the images include intracardiac echocardiography (ICE) images;

S2: Analyzing the ICE images to obtain image analysis results; and

S3: Generating an intervention surgical plan based on the image analysis results to guide the intervention surgery.

Specifically, in step S1, the collection of images can be performed using intracardiac echocardiography (ICE), transesophageal echocardiography (TEE), or integrated images of ICE and TEE obtained from intravascular ultrasound imaging devices. These image data can be raw data from intravascular ultrasound imaging devices, DICOM (Digital Imaging and Communications in Medicine) images or videos, or preoperative images such as two-dimensional, three-dimensional, or four-dimensional computed tomography (CT), computed tomography angiography (CTA), extracorporeal ultrasound images, and magnetic resonance images (MRI).

Additionally, inputs related to the type of surgery (e.g., LAA closure) and device information (e.g., device type and size) can be collected. This information can also be used to suggest appropriate imaging procedures. For example, while imaging catheters are typically inserted via the femoral vein, in procedures such as transcatheter aortic valve replacement (TAVR), alternative veins such as the internal jugular vein can be chosen for catheter insertion, which not only improves image quality but also provides operational convenience.

For step S2, various image processing algorithms such as image segmentation algorithms, object detection algorithms, image tracking techniques, and image stitching techniques can be utilized to integrate and analyze the collected image data. This analysis provides information about the current position of the puncture catheter (angle, position, etc.). Based on this information, the optimal puncture angle, depth, and timing can be determined, and at least one of these can be included in the intervention surgery plan. The plan includes the target puncture angle, timing, and depth.

In step S3, the intervention surgical plan is used to guide the catheter operation to execute the intervention surgery according to the optimal puncture angle, depth, and timing specified in the plan. In these implementations, intervention surgery planning is achieved by analyzing the intracardiac echocardiography (ICE) images to find the optimal puncture angle, depth, and timing before puncture, thereby guiding the intervention surgery.

Figure 2:
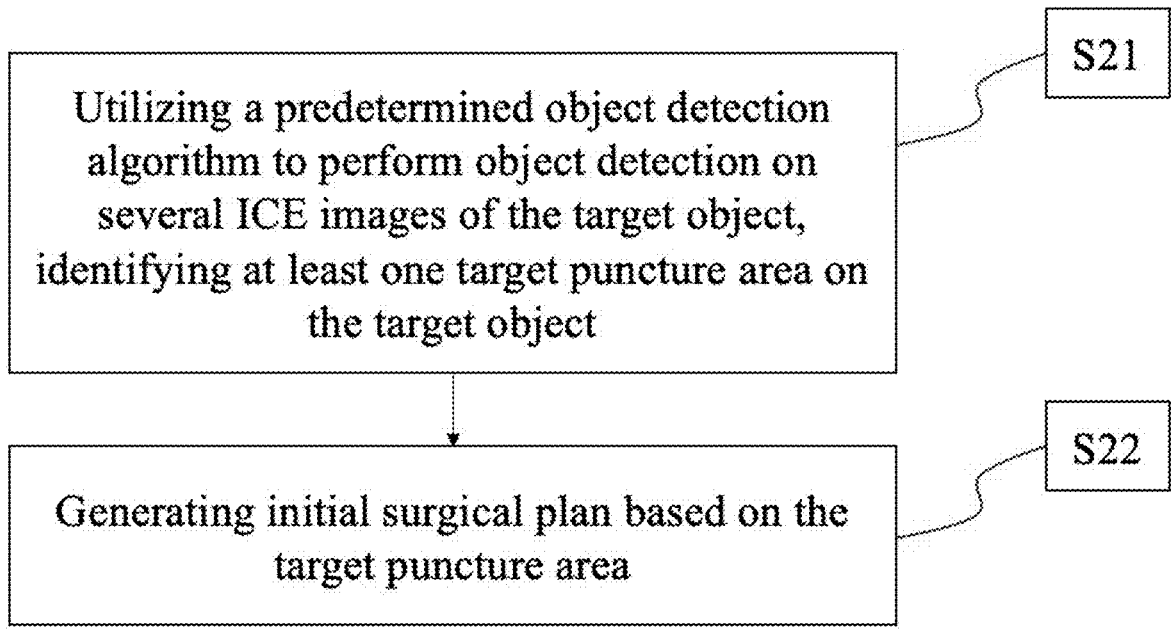
FIG. 2 is a flowchart of an exemplary method to implement step S2 of the method for guiding interventional surgery in FIG. 1, according to embodiments of the present disclosure.

In embodiments, as shown in FIG. 2, step S2 and S3 can be implemented as:

S21. Utilizing a predefined object detection algorithm to perform object detection on several images of the target object, identifying at least one target puncture area on the target object.

S22. Generating initial surgical plan based on the target puncture area.

Specifically, for intervention surgeries targeting different objects, the selection of puncture regions varies. Additionally, for different individuals, the puncture risk and the success rate of surgery within the same puncture region may differ.

By employing a predefined object detection algorithm (e.g., object detection models), real-time tracking of the catheter position and anatomical structures provided by real-time ICE or TEE images is performed. This facilitates the identification and labeling of the target puncture area and vascular regions on the target object, aiding doctors in complication identification. Through the detection of the target puncture area, multiple target puncture positions meeting predefined puncture criteria are identified. Corresponding interventional surgery planning schemes are generated, and an assessment is made regarding the likelihood of post-puncture vascular or valvular damage and whether there is sufficient space to place the interventional surgical device. The interventional surgery planning scheme corresponding to the minimum likelihood of post-puncture vascular or valvular damage and with sufficient space for device placement is selected to guide the execution of the interventional surgery.

In a specific implementation, the target object includes the heart, and the target puncture region includes the fossa ovalis on the heart. Step S22 includes:

simulating geometric changes in the fossa ovalis caused by different candidate puncture positions;

when predefined puncture criteria are met in the geometric changes of the fossa ovalis, the candidate puncture position is determined as the target puncture position; and generating the interventional surgery planning scheme based on the target puncture position.

In a specific implementation, the steps for determining the puncture position as the target puncture position when predefined puncture criteria are met in the geometric changes of the fossa ovalis include:

checking whether there is a tenting sign in the geometric changes of the fossa ovalis. The tenting sign indicates the presence of a tent-like protrusion toward the left atrium at the interatrial septum before actual puncture;

if a tenting sign is present, checking if the tenting sign and the puncture needle are coaxial; and if they are coaxial, the position of the tenting sign is determined as the target puncture position.

Figure 3:
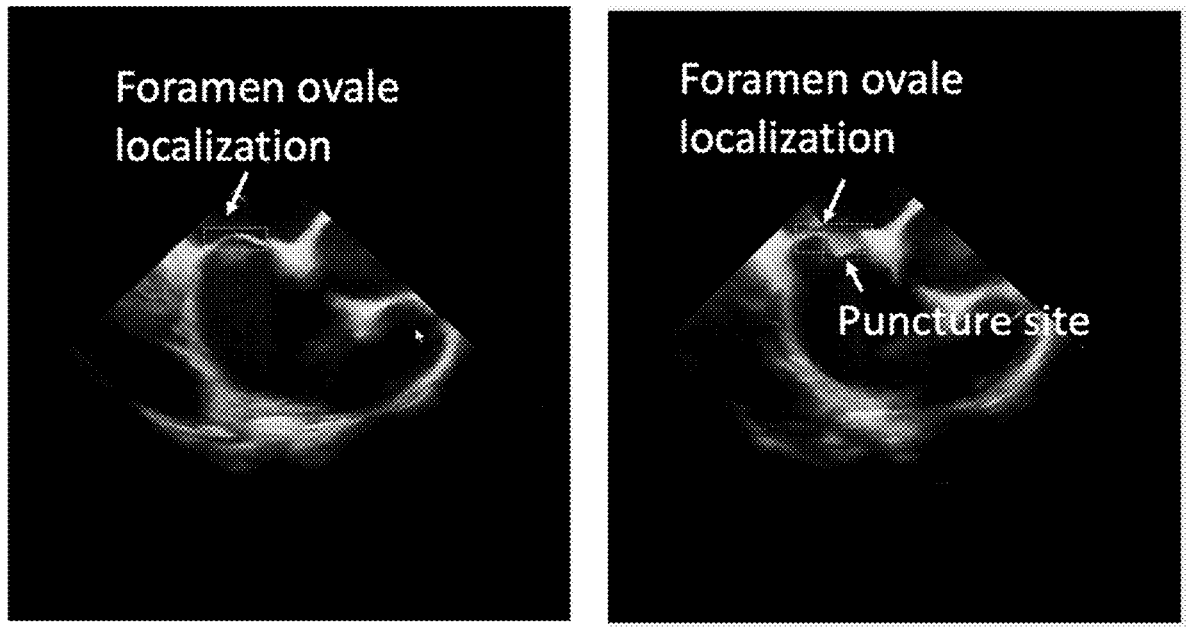
FIG. 3 is a schematic diagram showing locations of oval fossa and target puncture, according to embodiments of the present disclosure.

In the context of cardiac intervention surgeries, the fossa ovalis is typically targeted as the puncture region. By simulating geometric changes on the fossa ovalis caused by different puncture positions, the presence of a tent-like protrusion towards the left atrium at the interatrial septum (i.e., tenting sign) can be determined. If a tenting sign appears, further assessment is done to check if the tenting sign and the puncture needle are in coaxial alignment. If they are coaxial, the puncture position can be confirmed as the target puncture position, for generating the interventional surgery planning scheme based on the target puncture position. FIG. 3 illustrates exemplary locations of the fossa ovalis and the optimal puncture, which are delineated by bounding boxes.

In this process, the optimal imaging views can be detected automatically, semi-automatically, or fully manually. For instance, after the imaging catheter tip enters the heart, continuous image capture can be performed, providing guidance to clinical professionals to help them find the optimal view for catheter manipulation, whether through automatic guidance or manual adjustment.

In a specific embodiment, the method also includes:

constructing a three-dimensional anatomical model or a volumetric anatomical model of the target object based on several images.

In some embodiments, the three-dimensional anatomical model can be reconstructed directly from two-dimensional ICE and TEE images obtained from different angles and positions. In some alternative embodiments, if preoperative three-dimensional images are included in the collected image data, image fusion algorithms can be applied to generate/reconstruct a volumetric anatomical model with a larger field of view and a higher quality image that represents the combined shape. This volumetric anatomical model can be a four-dimensional anatomical model.

In some embodiments, the method also includes:

identifying the target puncture position on the three-dimensional anatomical model or volumetric anatomical model corresponding to the target object.

Specifically, after obtaining the three-dimensional anatomical model or volumetric anatomical model corresponding to the target object, the determined target puncture position can be marked on the corresponding location of the model. This helps to clearly and precisely identify the specific location of the target puncture position within the target object.

In some embodiments, before step S2, the method also includes:

combining and processing several images to obtain a first image, where the field of view of the first image is larger than that of the individual images, and step S2 includes:

analyzing the first image to obtain the results of the first image analysis and generating an interventional surgery planning scheme based on the results of the first image analysis.

Specifically, multiple images from ICE or TEE can be fused using image stitching techniques to create a new image with a larger field of view (i.e., the first image). Subsequently, the new image is analyzed to obtain corresponding analysis results.

In some embodiments, before step S21, the method also includes:

using predefined image segmentation algorithms to segment several images into multiple second images, and step S21 includes:

performing object detection on several second images and/or several images based on predefined object detection algorithms.

Specifically, image segmentation algorithms can be employed to segment anatomical structures from preoperative images, which can include segmentation of the entire heart or finer anatomical structures such as atria and ventricles (both sides), valves, major vessels (pulmonary arteries and veins, aorta, etc.), and coronary arteries and veins. Once the second images are segmented, the predefined object detection algorithm can be used to perform object detection on the segmented second images. Of course, the predefined object detection algorithm can also be utilized to perform object detection on the original image images. The specific object detection images can be selected based on actual needs, and this embodiment does not impose specific limitations on this aspect.

Figure 4:
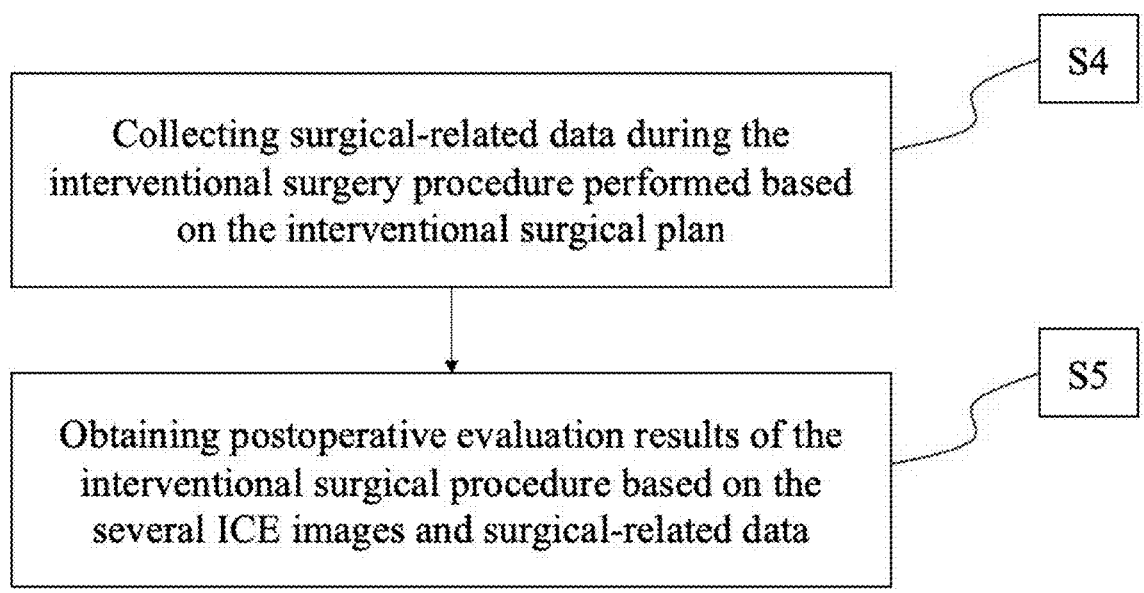
FIG. 4 is a flowchart of another exemplary method for guiding interventional surgery, according to embodiments of the present disclosure.

In some embodiments, as shown in FIG. 4, the method also includes:

S4. Collecting surgical-related data during the interventional surgery process, where the interventional surgery is performed based on the interventional surgery planning scheme.

S5. Obtaining postoperative evaluation results of the interventional surgery based on several images and surgical-related data.

Figure 5:
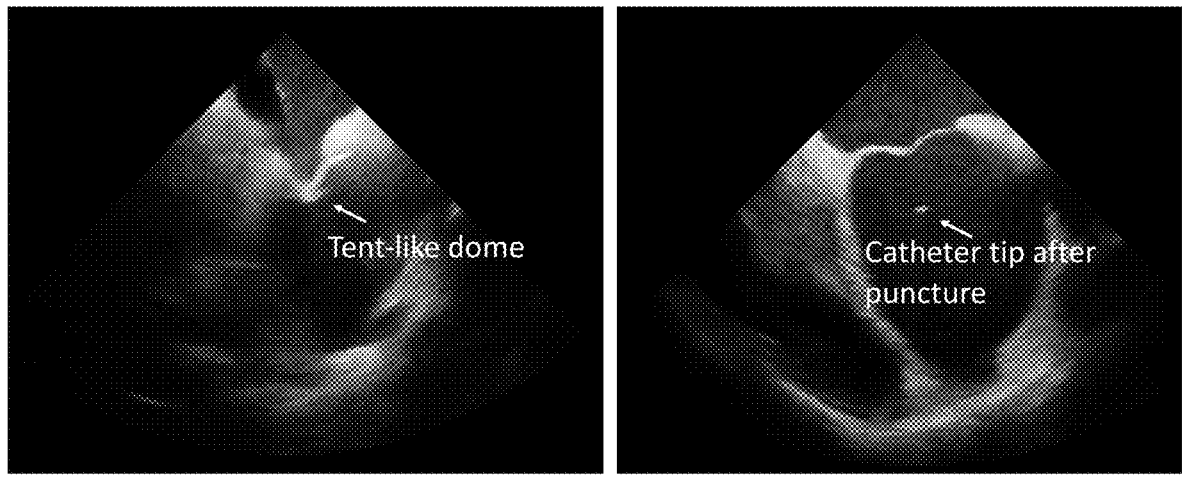
FIG. 5 is a schematic diagram showing a tent-like dome before puncture and the tip of a catheter after the puncture, according to embodiments of the present disclosure.

During the surgical procedure, real-time patient data (such as electrocardiogram, blood pressure curve, invasive or non-invasive blood pressure, cardiac output (CO), blood oxygen saturation (SpO2), etc.) is collected and integrated to enhance tracking accuracy. A four-dimensional beating heart model corresponding to the patient is established based on the patient data to predict target movements and provide guidance to clinical physicians during catheter operations. Additionally, tenting signs of the interatrial septum are detected and tracked during puncture procedures, as shown in FIG. 5, to ensure accurate positioning of the catheter.

Following the surgical procedure, the accuracy of device placement is evaluated, any complications are identified through analysis of postoperative images and patient data, and further intervention is determined if necessary. Surgical outcomes are predicted using imaging and patient data, providing ongoing assessment and management of any potential adverse effects or complications, assessing the success and safety of the puncture process.

In some embodiments, after step S4, the method further includes:

identifying surgical risks based on surgical-related data; and issuing warnings when the surgical risks meet predetermined conditions.

Specifically, surgical risks are identified during the surgical process, such as vascular or valve damage, by assessing preoperative imaging and real-time physiological information of patients during puncture procedures. Warnings and prompts are immediately issued when risks meet predetermined conditions to provide real-time assistance during the puncture process.

In some alternative embodiments, before step S4, the method further includes:

receiving modification parameters for interventional surgical planning; and updating the interventional surgical plan based on the modification parameters.

After generating the interventional surgical planning, clinical physicians can adjust and modify information regarding the optimal puncture site, puncture direction, and other parameters based on actual conditions. This information can be input through external interactions such as mouse clicks, text input, gestures, or voice prompts, or it can be generated automatically by a pre-trained large-scale model, for example, a generative artificial intelligence model.

In some embodiments, step S2 includes:

using a pre-set image segmentation algorithm to segment several images, resulting in several second images; and performing image analysis on the second image and integrating it with other image images to obtain corresponding quantitative analysis results and/or display results for the target.

Step S3 includes: based on the target quantitative analysis results and/or display results, generating the interventional surgery planning scheme to guide the execution of the interventional surgery.

Specifically, image segmentation algorithms can be utilized to segment anatomical structures from preoperative images, resulting in segmented second images. The second image can then undergo image analysis, integrating the second image with other images to obtain corresponding quantitative analysis results and/or visual display results for the target, for instance, quantitative measurements such as septal thickness, vascular geometric measurements, valve measurements can be performed from the segmented masks. Of course, quantitative measurements can also be directly computed from the original images. Additionally, object detection and classification algorithms can be employed to detect abnormalities in the anatomical structures of the second images, such as arterial aneurysms, providing valuable information for clinical physicians to consider. This valuable information can be effectively conveyed to clinical physicians through different colors, shapes, symbols, or text feedback, serving as effective alerts.

Intelligently evaluating the surgical situation based on the obtained target quantitative analysis results and/or display results, and generating the interventional surgery planning scheme accordingly. Moreover, the segmentation content in the second images can also assist in risk identification during the surgical process and postoperative risk assessment and treatment recommendations.

It should be noted that the methods guiding interventional surgery described above can be implemented through large-scale foundational models, such as large language models, large vision models, or large multimodal models. These models can utilize techniques like Few-Shot Learning or Smart Editing to achieve fully automatic, semi-automatic, or manual execution.

In this embodiment, image analysis of intracardiac echocardiography (ICE) is performed to plan interventional surgery before puncture, determining the optimal puncture angle, depth, and timing. This approach guides interventional surgery, conducts real-time detection and tracking during the puncture process, identifies and mitigates potential risks during surgery, enhances the success rate of surgery, and provides continuous assessment and management of any adverse effects or complications that may arise postoperatively, comprehensively reducing the risk of interventional surgery and improving the efficacy and safety of puncture surgery.

Figure 6:
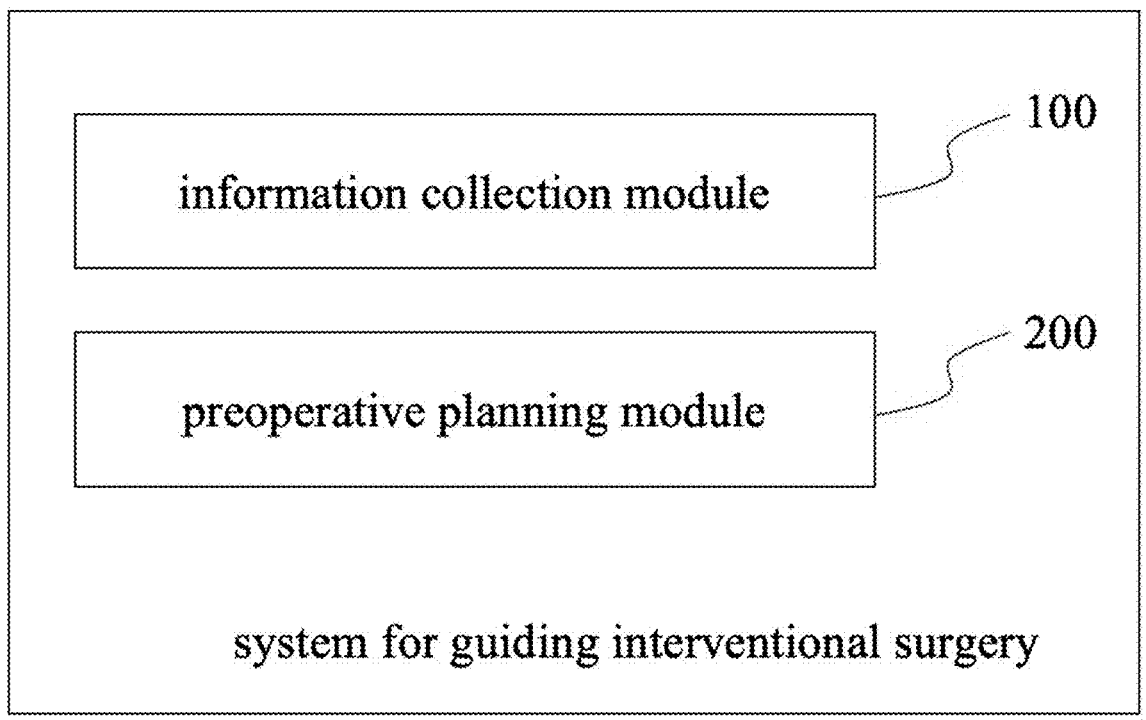
FIG. 6 illustrates a block diagram of an exemplary system for guiding interventional surgery, according to embodiments of the present disclosure.

Consistent with some embodiments, a system for guiding interventional surgery is provided, as shown in FIG. 6. The system includes an information collection module 100 and a preoperative planning module 200.

The information collection module 100 is used to collect several images of the target object during a predetermined period.

The preoperative planning module 200 is used to perform image analysis on several images to obtain image analysis results. Based on the image analysis results, it generates an interventional surgical planning to guide the execution of interventional surgery.

In a specific embodiment, the preoperative planning module 200 includes acquisition unit and generation unit.

The acquisition unit adopts a pre-set object detection algorithm to perform object detection on several images, obtaining the target puncture area on the target object.

The generation unit generates the interventional surgical planning based on the target puncture area.

In a specific embodiment, the target object includes the heart, and the target puncture area includes the fossa ovalis on the cardiac; The preoperative planning module 200 also includes a detection unit.

The detection unit simulates geometric changes in the fossa ovalis caused by different puncture positions. When the pre-set puncture criteria are met in the geometric changes of the fossa ovalis, the puncture position is determined as the target puncture position.

The generation unit is responsible for generating the interventional surgery planning scheme based on the target puncture position.

In a specific embodiment, the detection unit is also used to determine whether tenting signs appear in the geometric changes of the fossa ovalis. Tenting signs denote the formation of a tent-like dome pointing towards the left atrium at the interatrial septum before actual puncture occurs. If tenting signs are present, the detection unit further assesses whether the tenting sign is coaxial with the puncture needle. If it is, the position of the tenting sign is designated as the target puncture position.

In a specific embodiment, the interventional surgical planning includes at least one of the target puncture angle, the target puncture timing, or the target puncture depth.

In a specific embodiment, the system further includes a construction module, and the construction module is used to construct a three-dimensional anatomical model or a stereoscopic anatomical model of the target object based on several images.

In a specific embodiment, the system further includes an identification module, and the identification module is used to mark the target puncture position on the three-dimensional anatomical model or stereoscopic anatomical model corresponding to the target object.

In a specific embodiment, the system further includes a fusion processing module, and the fusion processing module is used to fuse/merge several images to obtain a first image. The field of view of the first image is greater than that of the image. The preoperative planning module 200 further performs image analysis on the first image to obtain the first image analysis results and generates an interventional surgical planning based on the first image analysis results.

In a specific embodiment, the system further includes an image segmentation module, and the image segmentation module is used to segment several images using a pre-set image segmentation algorithm, resulting in several second images. The acquisition unit is also used to perform object detection on several second images and/or several images based on a pre-set object detection algorithm.

In a specific embodiment, the pre-set object detection algorithm includes a large-scale object detection model such as a large-scale foundational model.

Figure 7:
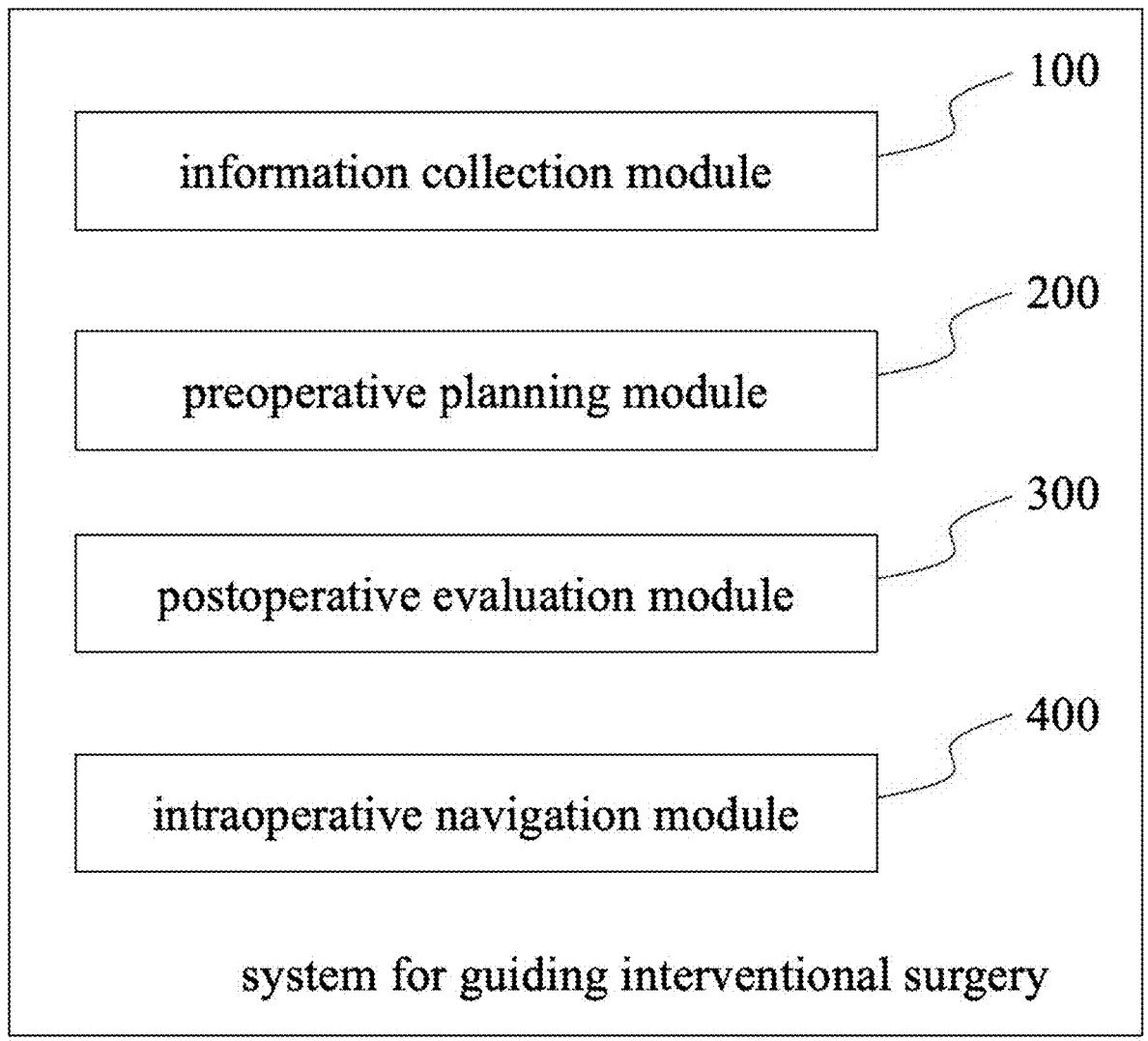
FIG. 7 illustrates a block diagram of another exemplary system for guiding interventional surgery, according to embodiments of the present disclosure.

In a specific embodiment, as shown in FIG. 7, the system further comprises a postoperative evaluation module 300, and the information collection module 100 is also used to collect surgical-related data during the interventional surgery process, which is executed based on the interventional surgical planning;

The postoperative evaluation module 300 is used to obtain postoperative evaluation results of the interventional surgery based on several images and surgical-related data.

In a specific embodiment, the system further comprises an intraoperative navigation module 400, and the intraoperative navigation module 400 is used to identify surgical risks based on surgical-related data, and warnings are issued when surgical risks meet predetermined conditions.

In a specific embodiment, the system further comprises a parameter receiving module, and the parameter receiving module is used to receive modification parameters for the interventional surgical planning. The preoperative planning module 200 further updates the interventional surgical planning based on the modification parameters.

In a specific embodiment, the parameter receiving module is also used to receive modification parameters from external interactive inputs.

In a specific embodiment, the parameter receiving module is also used to receive modification parameters generated by a pre-trained large model.

In a specific embodiment, the image segmentation module is further used to segment several images using a pre-set image segmentation algorithm, resulting in several second images;

The preoperative planning module 200 is also used for performing image analysis on the second image, and integrating it with other image images to obtain corresponding quantitative analysis results and/or display results for the target. Based on the target quantitative analysis results and/or display results, the module generates the interventional surgery planning scheme to guide the execution of the interventional surgery.

Because the disclosed system corresponds essentially to the disclosed method, relevant explanations can be referred to the corresponding part of the method embodiment. The described system embodiments are illustrative, and the units described as separate components may or may not be physically separate. The components described as units may or may not be physical units and may be located in one place or distributed across multiple network units. Partial or all modules can be selected according to actual needs to achieve the purpose of the disclosed solution.

Figure 8:
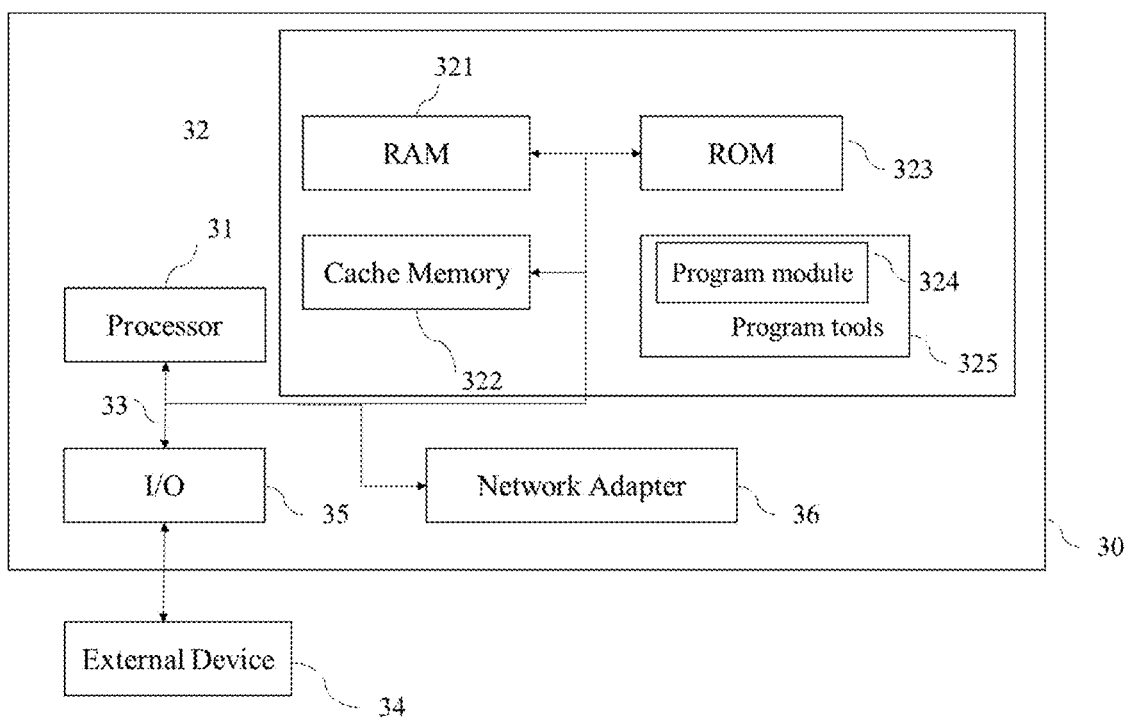
FIG. 8 illustrates a block diagram of an exemplary electronic device, according to embodiments of the present disclosure.

This embodiment performs image analysis on intracardiac echocardiography (ICE) before puncture to plan interventional surgery, determining the optimal puncture angle, depth, and timing. It guides interventional surgery, conducts real-time detection and tracking during the puncture process, identifies and mitigates potential risks during surgery, enhances the success rate of surgery, and performs postoperative evaluation. It provides continuous assessment and management of any adverse effects or complications that may arise, comprehensively reducing the risk of interventional surgery and improving the efficacy and safety of puncture surgery. FIG. 8 illustrates a block diagram of the structure of an electronic device, as exemplified in one embodiment disclosed herein. The electronic device includes a memory, a processor, and a computer program stored in the memory and configured to run on the processor. When executed by the processor, the computer program implements the method for guiding interventional surgery described in any of the embodiments. Electronic device 30 shown in FIG. 8 is merely an example and should not impose any limitations on the functionality and scope of use of the embodiments disclosed herein.

As illustrated in FIG. 8, electronic device 30 can be presented in the form of a general computing device, such as a server device. Components of electronic device 30 may include, but are not limited to: at least one processor 31, at least one memory 32, and a bus 33 connecting different system components (including memory 32 and processor 31).

Bus 33 includes a data bus, an address bus, and a control bus.

Memory 32 may include volatile memory, such as random-access memory (RAM) 321 and/or cache memory 322, and may further include read-only memory (ROM) 323.

Memory 32 may also include a program tool 325 with a set (at least one) of program modules 324, such as an operating system, one or more applications, other program modules, and program data. Each of these examples or a combination thereof may include implementation of a network environment.

Processor 31 executes various functional applications and data processing by running computer programs stored in memory 32, such as the method for guiding interventional surgery provided in any of the embodiments.

Electronic device 30 may also communicate with one or more external devices 34 (such as a keyboard, pointing device, etc.). This communication can be through an input/output (I/O) interface 35. Additionally, electronic device 30 may communicate with one or more networks (such as a local area network (LAN), wide area network (WAN), and/or public network such as the Internet) via a network adapter 36. As shown in the figure, network adapter 36 communicates with other modules of electronic device 30 via bus 33. It should be understood that, although not shown in the diagram, electronic device 30 may be combined with other hardware and/or software modules, including but not limited to: microcode, device drivers, redundant processors, external disk drive arrays, RAID (disk array) systems, tape drives, and data backup storage systems.

It should be noted that although several units/modules or sub-units/modules of electronic devices are mentioned in detail above, such division is merely exemplary rather than mandatory. In fact, according to the embodiments disclosed herein, the features and functions of the aforementioned two or more units/modules can be embodied in a single unit/module. Conversely, the features and functions of one unit/module described above can be further subdivided and embodied by multiple units/modules.

The present application further provides a computer-readable storage medium storing a computer program, wherein the program, when executed by a processor, implements the method of introducing intervention described in any one of the embodiments provided above.

Specific examples of the computer-readable storage medium may include but are not limited to: portable disks, hard disks, random-access memory, read-only memory, erasable programmable read-only memory, optical storage devices, magnetic storage devices, or any suitable combination thereof.

The program code for executing the disclosed computer program may be written in one or more programming languages in any combination. The program code may be executed entirely on a user device, partially on a user device, as a standalone software package, partially on a user device and partially on a remote device, or entirely on a remote device.

While specific embodiments of the present disclosure have been described above, it should be understood by those skilled in the art that these are merely examples. The scope of the present disclosure is defined by the appended claims. Those skilled in the art may make various changes or modifications to these embodiments without departing from the principles and essence of the present disclosure, all of which fall within the scope of the present disclosure.

What is claimed is:

1. A method for guiding interventional surgery using a catheter with a puncture needle on its tip to be inserted into a blood vessel of a patient, comprising:
   receiving, by an interface, a plurality of intracardiac echocardiography (ICE) images of a target object of the patient acquired within a predetermined period;
   performing, by a processor, image analysis on the plurality of ICE images to obtain image analysis results;
   performing, by the processor, object detection using a large-scale learning model to detect at least one object from the plurality of ICE images based on the image analysis results;
   simulating, by the processor, a plurality of geometric changes of the at least one object caused by the puncture needle in different candidate puncture positions on the at least one object, wherein each of the plurality of simulated geometric change simulates, in response to a simulated puncture performed by the puncture needle, how the at least one object would change in shape before the at least one object being physically punctured through by the puncture needle;
   determining, by the processor, a candidate puncture position among the different candidate puncture positions of the plurality of simulated punctures as a target puncture position based on the plurality of simulated geometric changes; and generating, by the processor, an interventional surgical plan to guide the interventional surgery including physically puncturing the at least one object at the target puncture position.

2. The method according to claim 1,
wherein:
performing, by the processor, the object detection using the large-scale learning model to detect the at least one object from the plurality of ICE images comprises:
identifying, by the processor, at least one target puncture area on the at least one object; and
simulating, by the processor, the plurality of geometric changes of the at least one object caused by the puncture needle in the different candidate puncture positions on the at least one object comprises:
simulating, by the processor, the plurality of geometric changes of the at least one object caused by the puncture needle in the different candidate puncture positions in the at least one target puncture area on the at least one object.

3. The method according to claim 2, wherein the at least one object comprises a heart and the at least one target puncture area comprises an area of a fossa ovalis on the heart,
wherein simulating, by the processor, the plurality of geometric changes of the at least one object caused by the puncture needle in the different candidate puncture positions in the at least one target puncture area on the at least one object comprises:
simulating, by the processor, the plurality of geometric changes of the heart in the fossa ovalis respectively caused by the puncture needle in the different candidate puncture positions in the fossa ovalis on the heart.

4. The method according to claim 3, determining, by the processor, the candidate puncture position among the different candidate puncture positions of the plurality of simulated punctures as the target puncture position based on the plurality of simulated geometric changes comprises:
determining that a tenting sign appears in the plurality of simulated geometric changes in the oval fossa, wherein the tenting sign is a tent-like dome pointing towards the left atrium at the interatrial septum before the heart being physically punctured through; and
designating a location of the tenting sign as the target puncture position when the tenting sign is coaxial with the puncture needle that performs the simulated puncture.

5. The method according to claim 2, further comprising:
constructing a three-dimensional anatomical model or a volumetric anatomical model of the target object based on the plurality of ICE images.

6. The method according to claim 5, further comprising:
identifying the target puncture position on the three-dimensional anatomical model or volumetric anatomical model of the target object.

7. The method according claim 2, wherein detecting the at least one object from the plurality of ICE images using the large-scale learning model, further comprises:
segmenting the plurality of ICE images using a predetermined image segmentation algorithm to obtain a plurality of second images; and
detecting the at least one object on the second images using the large-scale learning model.

8. The method according to claim 2, wherein the large-scale learning model comprises a large-scale foundational model.

9. The method according to claim 1, wherein the interventional surgical plan comprises at least one of a target puncture angle, a target puncture timing, or a target puncture depth.

10. The method according to claim 1, wherein performing, by the processor,
the image analysis on the plurality of ICE images to obtain the image analysis results further comprises:
fusing the plurality of ICE images to obtain a first image, wherein the field of view of the first image is greater than that of each of the ICE images; and
performing image analysis on the first image to obtain the image analysis results.

11. The method according to claim 1, further comprising:
collecting surgical-related data during an interventional surgical procedure performed according to the interventional surgical plan; and
obtaining a postoperative assessment result of the interventional surgical procedure based on the plurality of ICE images and the surgical-related data.

12. The method according to claim 11, further comprising:
identifying a surgical risk based on the surgical-related data; and
issuing a warning when the surgical risk meets predefined criteria.

13. The method according to claim 11, wherein prior to performing the interventional procedure according to the intervention surgical plan, the method further comprises:
receiving modification parameters for the interventional surgical plan; and
updating the interventional surgical plan based on the modification parameters.

14. The method according to claim 13, wherein the modification parameters are received from external interactive input.

15. The method according to claim 13, wherein the modified parameters are generated by a pre-trained artificial intelligence model.

16. The method according to claim 1, wherein performing, by the processor, the image analysis on the plurality of ICE images comprises:
segmenting the plurality of ICE images using a predetermined image segmentation algorithm to obtain a plurality of second images;
analyzing the plurality of second images to obtain corresponding quantitative analysis results or display results integrated with the plurality of ICE images for the target object; and
based on the target quantitative analysis results or the display results, generating the interventional surgery plan to guide the interventional surgery.

17. A system for guiding interventional surgery using a catheter with a puncture needle on its tip to be inserted into a blood vessel of a patient, comprising:
an interface configured to receive a plurality of intracardiac echocardiography (ICE) images of a target object of the patient acquired within a predetermined period; and
a processor configured to:
perform image analysis on the plurality of ICE images to obtain image analysis results;
perform object detection using a large-scale learning model to detect at least one object from the plurality of ICE images based on the image analysis results;
simulate a plurality of geometric changes of the at least one object caused by the puncture needle in different candidate puncture positions on the at least one object, wherein each of the plurality of simulated geometric change simulates, in response to a simulated puncture performed by the puncture needle, how the at least one object would change in shape before the at least one object being physically punctured through by the puncture needle;

determine a candidate puncture position among the different candidate puncture positions of the plurality of simulated punctures as a target puncture position based on the plurality of simulated geometric changes; and generate an interventional surgical plan to guide the interventional surgery including physically puncturing the at least one object at the target puncture position.

18. The system according to claim 17, wherein to perform the object detection using the large-scale learning model to detect the at least one object from the plurality of ICE images based on the image analysis results, the processor is further configured to:

identify at least one target puncture area on the at least one object; and wherein to simulate the plurality of geometric changes of the at least one object caused by the puncture needle in the different candidate puncture positions on the at least one object, the processor is further configured to:

simulate the plurality of geometric changes of the at least one object caused by the puncture needle in the different candidate puncture positions in the at least one target puncture area on the at least one object.

19. The system according to claim 18, wherein the processor is further configured to:

construct a three-dimensional anatomical model or a volumetric anatomical model of the target object based on the plurality of ICE images; and identify the target puncture position on the three-dimensional anatomical model or volumetric anatomical model of the target object.

20. A non-transitory computer-readable storage medium storing a computer program, wherein the computer program, when executed by a processor, implements a method for guiding interventional surgery using a catheter with a puncture needle on its tip to be inserted into a blood vessel of a patient, the method comprising:

receiving a plurality of intracardiac echocardiography (ICE) images of a target object of the patient acquired within a predetermined period;

performing image analysis on the plurality of ICE images to obtain image analysis results;

performing object detection using a large-scale learning model to detect at least one object from the plurality of ICE images based on the image analysis results;

simulating a plurality of geometric changes of the at least one object caused by the puncture needle in different candidate puncture positions on the at least one object, wherein each of the plurality of simulated geometric change simulates, in response a simulated puncture performed by the puncture needle, how the at least one object would change in shape before the at least one object being physically punctured through by the puncture needle;

determining a candidate puncture position among the different candidate puncture positions of the plurality of simulated punctures as a target puncture position based on the plurality of simulated geometric changes; and generating an interventional surgical plan to guide the interventional surgery including physically puncturing the at least one object at the target puncture position.

* * * * *